Patented Nov. 16, 1926.

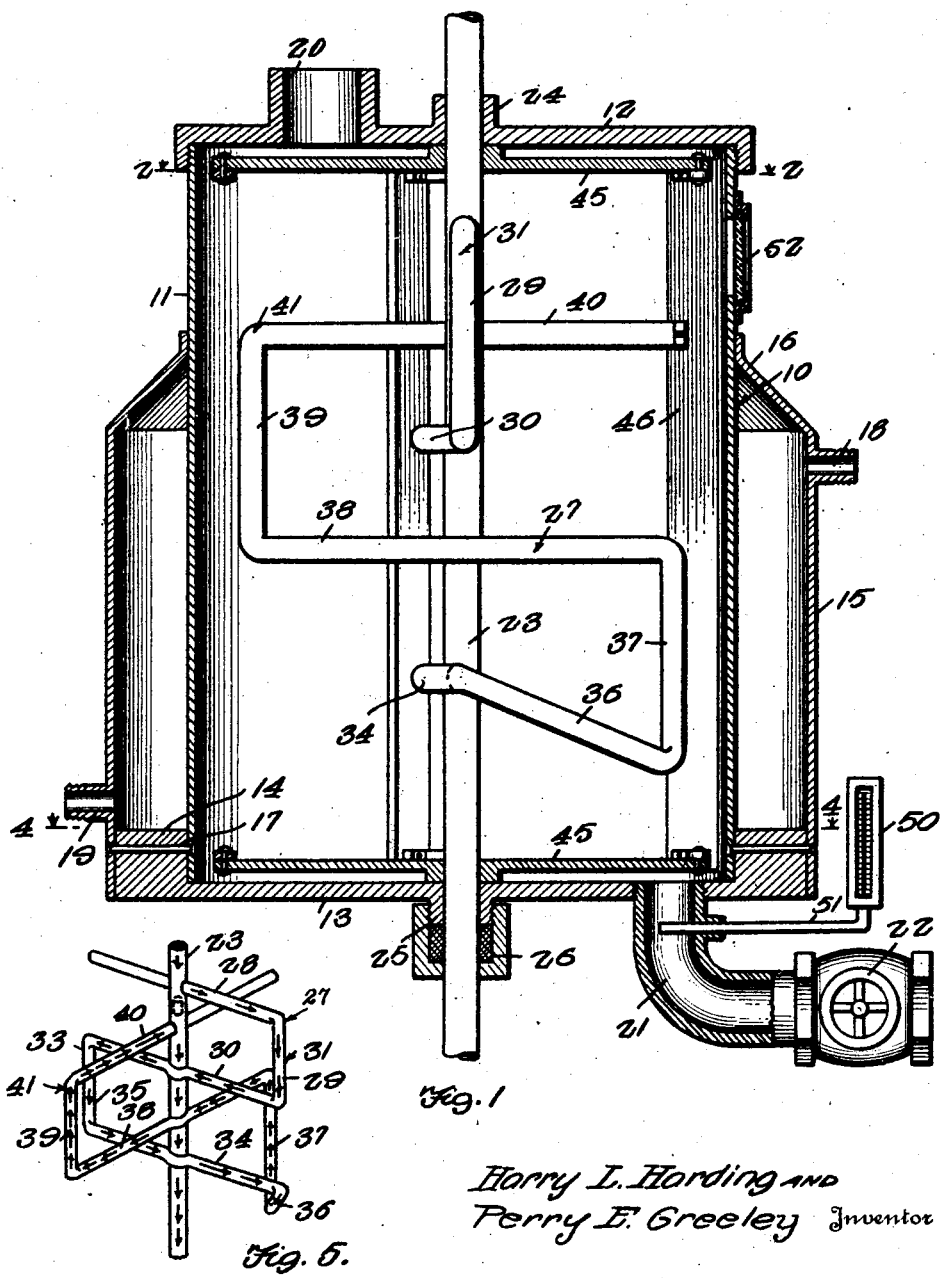

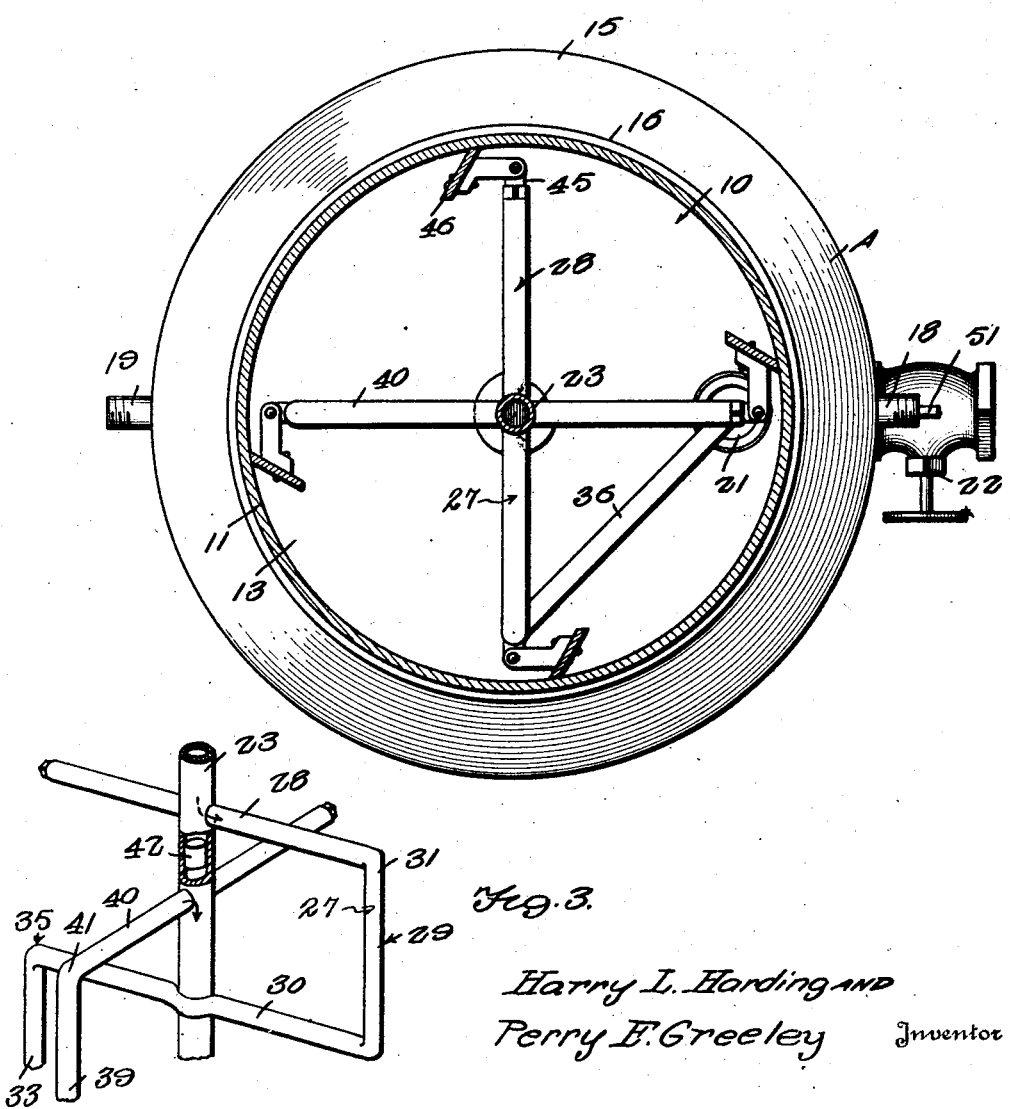

1,607,345

UNITED STATES PATENT OFFICE.

HARRY L. HARDING AND PERRY E. GREELEY, OF SOUTH LEBANON, OHIO.

VEGETABLE COOKER.

Application filed June 9, 1925. Serial No. 35,873.

This invention appertains to a novel cooking device for vegetables and more particularly to a novel means for cooking green corn prior to the canning thereof.

The primary object of the present invention is to provide a continuous cooker so constructed that the entrance of steam into the material being cooked is entirely eliminated, thereby insuring the sanitary cooking of the material without hurting the flavor and color thereof.

Another object of the invention is to provide a continuous cooker for green corn in which novel means is provided for agitating the corn during the cooking process and for distributing the heat uniformly throughout the mass of corn being cooked, without subjecting the corn to the direct action of the cooking medium such as steam.

A further object of the invention is to provide a continuous green corn cooker embodying a copper kettle or boiler having a jacket partially surrounding the same for receiving the cooking medium such as steam, the kettle also having mounted therein a novel hollow stirrer for agitating the green corn with novel means for circulating steam through the stirrer, whereby the entire mass of corn will be uniformly heated.

A still further object of the invention is the provision of a rotatable coil disposed within the cooking vessel for acting as a stirrer for the corn, with novel means for directing steam through the coil.

A further object of the invention is the provision of means rotatable with the coil for engaging the side of the cooking vessel or container for preventing the sticking of the corn to the sides thereof.

A further object of the invention is the provision of novel means for introducing the green corn into the cooking vessel or container and for draining the corn therefrom.

A still further object of the invention is to provide a novel cooker of the above character, which will be durable and efficient in use, one that will be simple and easy to manufacture and one which can be placed upon the market at a reasonable cost.

With these and other objects in view, the invention consists in the novel construction, arrangement and formation of parts as will be hereinafter more specifically described, claimed, and illustrated in the accompanying drawings, in which:

Figure 1 is a central vertical section through the improved cooker,

Figure 2 is a horizontal section through the same taken on the line 2—2 of Figure 1 looking in the direction of the arrows, Figure 3 is a fragmentary perspective view partly in section showing the improved stirrer with the means for insuring the correct circulation of steam therethrough.

Figure 5 is a diagrammatic view of the stirrer showing the path of the steam through the stirrer arms.

Figure 4:
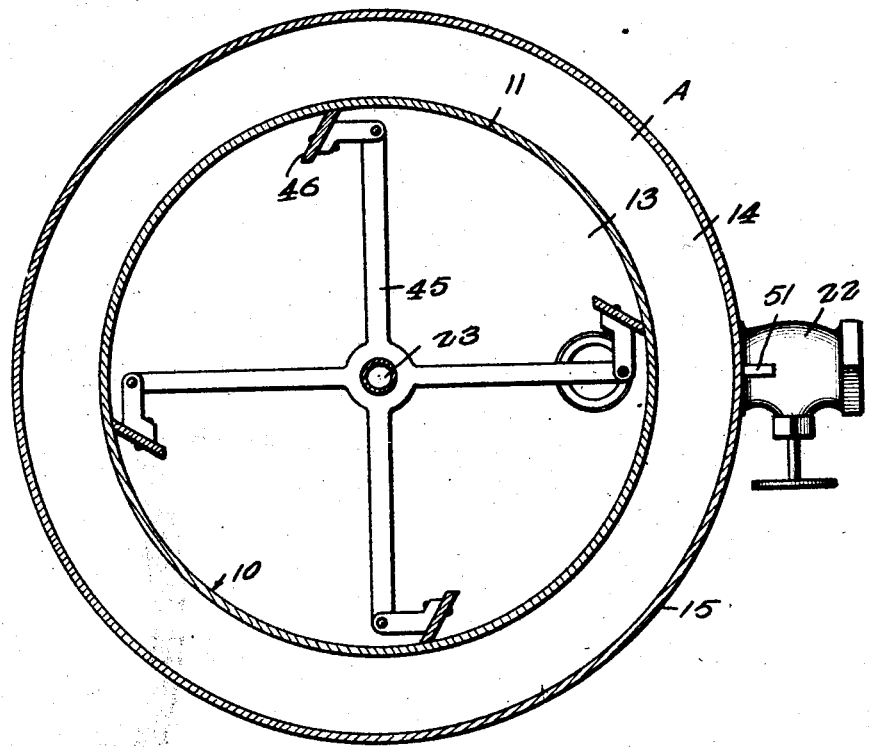
Figure 4 is a horizontal section taken on the line 4—4 of Figure 1 looking in the direction of the arrows.

Referring to the drawings in detail wherein similar reference characters designate corresponding parts throughout the several views, the letter A generally indicates the improved apparatus, which comprises a kettle or container 10, preferably formed from copper or some other suitable non-corrodible metal. This kettle or container 10 includes a cylindrical drum 11 having threaded on the upper end thereof a suitable head or disk 12 which also can be formed of copper. The lower end of the drum 11 is closed by the bottom wall or disk 13, which also can be formed of copper and this disk or bottom wall has formed on the periphery thereof an upstanding annular flange 14 which engages the outer surface of the drum at the lower end thereof. The container 10 is adapted to receive the corn to be cooked and surrounding the kettle or container substantially two thirds of its height is a steam jacket 15. The upper end of the steam jacket 15 is bent inwardly and secured to the drum 11 in any preferred way, as at 16, while the lower edge of the jacket engages the outer periphery of the disk bottom wall 13 and the spacing rib or flange 14. Suitable rivets 17 can be extended through the drum, jacket and flange 14 as shown in Figure 1 of the drawings to retain these parts in proper assembled position. The jacket 15 adjacent to the upper end thereof is provided with a steam inlet nipple 18 and adjacent to its lower end a steam outlet nipple 19. Suitable steam supply and exhaust pipes can be connected with the nipples 18 and 19 respectively.

The top wall or disk 12 of the container is provided with an eccentrically disposed filling opening 20 by means of which the green corn is introduced into the container and the bottom wall or disk 13 is provided with an eccentrically disposed outlet pipe 21 and the flow of the green corn through the outlet pipe is controlled by a suitable gate or valve 22.

In order to insure the correct cooking of the corn and the uniform distribution of heat therethrough, an axially disposed hollow shaft 23 is arranged within the container and suitable bearings 24 and 25 are carried by the opposite ends of the container for rotatably supporting said hollow shaft. A suitable stuffing box 26 can be provided for the lower bearing to prevent the escape of liquid from the container.

Steam is adapted to be supplied to the hollow shaft 23 in any desired way and this shaft can be rotated in any preferred manner (not shown) in the drawings. Associated with the hollow shaft 23 and rotatable therewith is a novel stirrer or agitator 27 for the corn. This stirrer or agitator 27 is constructed from hollow copper tubes, and steam is adapted to flow therethrough so as to cook the corn uniformly throughout. The stirrer is so formed as to provide a plurality of radially extending arms and by referring to Figures 3 and 5, it can be seen that the tubes forming the stirrer consist of an upper horizontal arm 28 extending through the hollow shaft 23 for communication therewith and then downwardly as at 29 and horizontally to form a second arm 30 which extends around or through the shaft 23 and does not communicate therewith. This forms the first stirrer arm as indicated by the reference character 31. The arm 30 extends equi-distant on opposite sides of the shaft 23 and is bent downwardly to provide the vertical run 33 and inwardly to form the third arm 34 which also extends entirely through or around the shaft. This provides the second stirrer arm as indicated by the reference character 35. The horizontal disposed tube 34 also projects equal distances from the hollow shaft 23 and the end thereof opposite from the vertical run 33 is bent downwardly and outwardly as at 36 and terminates at a point intermediate the stirrer arms 31 and 35. The tube is then bent upwardly to provide a vertical length 37 which terminates at a point equi-distant the horizontal length or tube 30 and 34 and extends entirely through or around the hollow shaft 23. This horizontal length 38 extends equal distances beyond the shaft and the end thereof opposite from the vertical length 37 is bent upwardly to provide a second vertical length 39 which is then extended into a horizontal length 40 which extends through and communicates with the shaft 23. This provides a third stirrer arm as indicated by the reference character 41.

Arranged within the hollow shaft 23 intermediate the horizontal lengths or tubes 28 and 40 is a plug 42 which prevents direct passage of steam through the shaft. In operation, the steam flows in the shaft from the upper end thereof and enters the first horizontal length or tube 28, through the vertical length or tube 29, through the horizontal length or tube 30, through the length 33, length 34, up the vertical length 37 and then through the horizontal length 38, the vertical length 39, through the horizontal length 40 and down through the shaft and out of the container, when the same is exhausted.

It is obvious that while the shaft 23 is rotated, the arms formed by the tubes will not only agitate the corn, but thoroughly cook the same and distribute the heat uniformly throughout the mass thereof and thus cooperate efficiently with the jacket 15 for cooking the corn.

In order to prevent sticking of the corn to the inner surface of the drum 11, radially extending arms 45 are carried by the shaft 23 adjacent to the upper and lower ends of the container and these arms are connected by vertically disposed scraping blades 46 which are adapted to engage the inner face of the said drum.

A thermometer 50 is provided for the cooker and the tube 51 therefor can be extended into the outlet pipe 21 in order to keep the temperature of the corn being taken from the cooker.

In order that the height of the corn in the cooker can be readily observed a glass panel 52 is inserted within the drum 11 adjacent to the upper end thereof as will be readily seen by referring to Figure 1 of the drawings.

In use of the improved cooker, the corn is introduced into the container through the filling nipple 20 and the steam is allowed to circulate through the steam jacket and through the stirrer 27 as heretobefore described. During the rotation of the shaft 23 the corn will be thoroughly agitated and the heat effectively distributed through the mass of the corn. During the cooking of the corn, the vapors are automatically exhausted therefrom and thus when the corn is taken from the drum the same is ready for canning and can be placed directly in the cans. As stated the corn is allowed to flow from the container through the pipe 21 and this flow is controlled by the said gate or valve 22. Owing to the construction of the container, the corn can be easily introduced into the cooker and after the same is cooked, exhausted therefrom, thereby making a substantial continuous cooker.

The apparatus and method of cooking the corn is a decided improvement over the methods now employed in the canning industries such as cooking the corn in the can, in which it is necessary to exhaust vapors from each can or introducing the steam directly into the corn, which tends to harden the corn and change the color thereof. The mingling of the steam direct with the corn also reduces the delicate flavor thereof.

While we have stated that the cooker is particularly adapted for cooking green corn, it is to be understood that the same can be used for cooking other vegetables, fruits and boiling down tomato pulp.

Changes in details may be made without departing from the spirit or scope of this invention, but:

Having thus described our invention, what we claim as new is:

1. A continuous cooker for vegetables and the like comprising a vessel, a steam jacket surrounding the vessel and extending the greater portion of its height, means for introducing the material to be cooked into the vessel through the upper end thereof, means for removing the material to be cooked at the lower end of the vessel, a hollow shaft rotatably carried by the vessel and disposed axially within the same, an imperforate coil carried by the shaft and communicating therewith at different points embodying a plurality of radially extending stirrer arms, the stirrer and the hollow shaft adapted to have steam flow therethrough for distributing heat throughout the entire mass of the material to be cooked, radially extending rigid arms carried by the shaft adjacent to the upper and lower ends of the vessel, and scraping blades connected to the terminals of the arms for engaging the inner face of the vessel.

2. In a cooker of the character described, a vessel embodying a cylindrical drum, a head carried by the upper end of the drum having an eccentrically disposed filling opening, a disk carried by the lower end of the drum having an annular peripheral flange engaging the outer surface of the drum, a jacket fitted against the flange and partially surrounding the drum having the upper end thereof converged to contact with the drum, an outlet spout carried by the lower end of the vessel, means for controlling the flow of the material through the spout, bearings carried by the axial center of the head and disk, a hollow shaft rotatably mounted within the bearings, a hollow imperforate coil communicating with the shaft at different points embodying a plurality of radially extending stirrer arms, the shaft and coil being adapted to have cooking medium flow therethrough, and rigid stirrer scraping arms rotatable with the shaft for engaging the inner face of the drum.

In testimony whereof we affix our signatures.

HARRY L. HARDING.
PERRY E. GREELEY.